United States Patent [19]
Bockman et al.

[11] Patent Number: 5,450,532
[45] Date of Patent: Sep. 12, 1995

[54] CACHE MEMORY SYSTEM FOR A COLOR INK JET PRINTER

[75] Inventors: Francis E. Bockman, San Diego; Kirt A. Winter, Escondido, both of Calif.

[73] Assignee: Hewlett-Packard Company, Palo Alto, Calif.

[21] Appl. No.: 55,073

[22] Filed: Apr. 29, 1993

[51] Int. Cl.[6] .............................................. G06F 15/00
[52] U.S. Cl. ...................................... 395/115; 395/164
[58] Field of Search ............... 395/116, 115, 164, 165, 395/166, 162; 358/517, 523, 524, 525; 346/157; 345/186, 187, 189, 190, 192, 200, 203, 153

[56] References Cited

U.S. PATENT DOCUMENTS

| | | | |
|---|---|---|---|
| 4,270,141 | 5/1981 | Sakamoto | 358/525 |
| 4,953,104 | 8/1990 | Yeh et al. | 346/157 |
| 4,954,889 | 9/1990 | Endo et al. | 358/523 |
| 4,965,751 | 10/1990 | Thayer et al. | 345/200 |
| 5,029,105 | 7/1991 | Coleman et al. | 395/166 |
| 5,056,044 | 10/1991 | Frederickson et al. | 395/164 |
| 5,131,080 | 7/1992 | Fredrickson et al. | 395/164 |
| 5,170,468 | 12/1992 | Shah et al. | 395/166 |

*Primary Examiner*—Mark R. Powell
*Assistant Examiner*—Dov Popovici

[57] ABSTRACT

A color printer receives P, N-bit values indicating a computer generated color to be printed, there being $2^{NP}$ possible combinations of bits in the P, N-bit color values. Each N-bit value has a least significant bit (LSB). Upon receiving P, N-bit color values, the color printer creates an address from P combined multiple-bit segments of each of the received N-bit values, each multiple bit segment excluding at least a LSB of each N-bit value. The color printer includes a cache memory having substantially less addresses than $2^{NP}$, each cache address including first and second entries, a first entry being P values indicative of a computer generated color and a second entry being P values usable by the color printer to reproduce the first entry. A processor determines if there is a match at an address created from a received computer color value between a first entry and the received computer color value, the match disregarding an LSB of each N-bit value comprising the first entry at the address. The processor is responsive to a determined match to access the second entry at the address and to employ the second entry to control the color printer. Exclusion of the LSB's in determination of the presence of a match enables a substantially greater probability of finding such a match in the cache memory.

9 Claims, 3 Drawing Sheets

CACHE MEMORY SYSTEM FOR A COLOR INK JET PRINTER

FIELD OF THE INVENTION

This invention relates to color conversion, and more particularly, to color printers that employ cache memories for conversion of received computer-generated color values to ink jet printer color values.

BACKGROUND OF THE INVENTION

Color ink jet printers have been commercially available at least since 1988, with the introduction of the PaintJet printer by the Assignee of this application. A color ink jet printer produces high quality color graphics at high resolution, using a color ink jet print engine. Initially, the PaintJet printer used eight colors, at 180 dots per inch resolution to enable selection from a palette of 330 colors. While this capability was satisfactory for original document production, when such a printer was required to provide accurate reproduction of color images produced by a personal computer, additional color palette capabilities were required.

Eight bit values (bytes) are used by personal computers (PC's) to designate primary colors. To produce secondary colors, a PC uses combinations of the eight bit values to control the computer's display device (e.g. a color CRT). A three byte (i.e. 24 bit) value can represent $2^{24}$ different color values, which color values can be reproduced by appropriate control of the CRT's color guns. When, however, a color ink jet printer is called upon to accurately reproduce that many color values, extensive color processing is required that adds significantly to the execution time of the printer.

In order to reproduce a received color value, a color ink jet printer must convert the color value into a color command that is recognized by the ink jet printer engine. It was early realized that it was impractical to produce a color table map that mapped all $2^{24}$ possible PC-generated input colors to ink jet engine color codes. As a result, most early color ink jet drivers employed a cache scheme that was combined with a color table/map to accomplish the conversion. The procedures employed by the prior art color ink jet printers will be better understood by referring to FIGS. 1 and 2.

In FIG. 1, a high level block diagram illustrates a color ink jet printer 10 and a connected personal computer (PC) 12. PC 12 generated three byte color values to enable display 14 to display any of $2^{24}$ colors. If hard copy was required of the displayed image, a three byte value 16 defining red, green, and blue values, would be transferred as a PC-RGB value over interface connection 18 to PC-RGB register 20 in printer 10. A microprocessor 22 in printer 10 would then truncate the received PC-RGB value into a cache address and would store the address value in a cache address register 24. The truncation action used only the four least significant bits of each byte to make up a 12 bit address value. That address value would then be utilized to address a color cache 26 to determine if, at that address, a Source RGB value was stored that matched the value in PC-RGB register 20. If the color values matched, a corresponding "Destination" RGB value was accessed from the same address in color cache 26 and was employed by microprocessor 22 to control color print engine 28. If no match was found, the value in PC-RGB register 20 would be fed to a color map 30.

It will be understood that employing only the four least significant bits of each of the red, green and blue bytes in PC-RGB value 16 allowed many possible addresses ($2^{12}$) to be ignored. Thus, at any designated address, there was a substantial possibility that the Source RGB value 42 would not match the PC-RGB value. In such cases, resort to color map 30 became necessary. To preserve memory space, color map 30 only contained a limited number of selected color values and corresponding color print engine control values. As a result, if a received PC-RGB value was not found in color map 30 (as was likely), an interpolation procedure was executed using bracketing color values from color map 30. This action, while enabling an interpolated color print engine control value to be determined, was time consuming and slowed the performance of color ink jet printer 10.

In FIG. 2, a schematic illustrates further detail of the above-described procedure employed by color ink jet printer 10 in response to a received PC-RGB value 16. Microprocessor 22 would access the lower-most four significant bits of each of the red, green, and blue bytes to create a 12 bit concatenated address value 40. Address value 40 was then used to access one of $2^{12}$ (i.e. 4096) positions within color cache 26.

Color cache 26 contained two entries at each 12 bit address, i.e., a Source RGB value 42 comprising three eight bit bytes of red, green, and blue values and an associated "Destination" color value which also comprised three color value bytes, which color values were employed to control color print engine 28 (FIG. 1). Different Destination color values were required due to the fact that color print engine 28 operated in a "dither" mode to reproduce PC-RGB color values. The dither mode, in essence, calls for the interspersal of color dots of plural color values, which when viewed from a distance, appear to reproduce the desired PC-RGB value.

Initially (decision box 46), if it was determined that Source RGB value entry 42 was equal to a received PC-RGB value, Destination color value 44 was returned to color print engine 28 (box 48). If however, Source RGB value 42 was found not to match the PC-RGB value, then color map 30 was accessed at a Source RGB color value that most closely matched the value in PC-RGB register 20. An interpolation procedure then obtained a Destination color value to be used to control color print engine 28 (box 50).

To update color cache 26 (box 52), the Source RGB and Destination color values were replaced at the previously accessed address, as follows: the value in PC-RGB register 20 replaced Source RGB value 42 at the address and the interpolated Destination color value replaced Destination color value 44.

As a result of the described replacement procedure, color cache 26 was continually updated with newly interpolated values. Under worst case conditions, employing three byte PC-RGB values, cache "hit rates" (i.e., matches) between Source RGB values and PC-RGB values were approximately 16%. Under best case conditions, cache hit rates exceeded 50%. It was clear that cache hit rates could be improved significantly by increasing cache size. Thus, a 15 bit address size could enable a worst case hit rate of over 30% to be achieved. However, such an increased size cache would require 8 times the memory of color cache 26 and would be too costly.

Accordingly, it is an object of this invention to provide a color printer with an efficient cache system for having a high probability of matching a received PC RGB value with a stored Source RGB value.

It is another object of this invention to provide an improved color cache system for a color ink jet printer wherein a higher percentage of cache hits is achieved without requiring an expanded cache size over that used in prior art printers.

It is yet another object of this invention to provide a color ink jet printer that exhibits a higher print speed as a result of improved color cache hits by received PC-RGB color values.

SUMMARY OF THE INVENTION

A color printer receives P, N-bit values indicating a computer generated color to be printed, there being $2^{NP}$ possible combinations of bits in the P, N-bit color values. Each N-bit value has a least significant bit (LSB). Upon receiving P, N-bit color values, the color printer creates an address from P combined multiple-bit segments of each of the received N-bit values, each multiple bit segment excluding at least a LSB of each N-bit value. The color printer includes a cache memory having substantially less addresses than $2^{NP}$, each cache address including first and second entries, a first entry being P values indicative of a computer generated color and a second entry being P values usable by the color printer to reproduce the first entry. A processor determines if there is a match at an address created from a received computer color value between a first entry and the received computer color value, the match disregarding an LSB of each N-bit value comprising the first entry at the address. The processor is responsive to a determined match to access the second entry at the address and to employ the second entry to control the color printer. Exclusion of the LSB's in determination of the presence of a match enables a substantially greater probability of finding such a match in the cache memory.

DETAILED DESCRIPTION OF THE INVENTION

It has been determined that, with a minor loss in color reproduction accuracy, a substantially larger color cache can be simulated through the use of a procedure which ignores the least significant bit of each color byte of a received PC-RGB value. Since an ink jet printer employs a dither technique and computes which of 8 color dots to be interspersed on a page to represent a received PC-RGB color, a minor loss in accuracy of a reproduced color is generally not perceivable by the user. Thus, a cache size of $2^{15}$ addresses can be simulated by ignoring the least significant bit of each color byte value. By this procedure, many more matches are found between Source RGB values and received PC-RGB values. Such matches eliminate a requirement for a subsequent access to a color map, followed by an interpolation procedure and enable more rapid printer operation.

Figure 1:
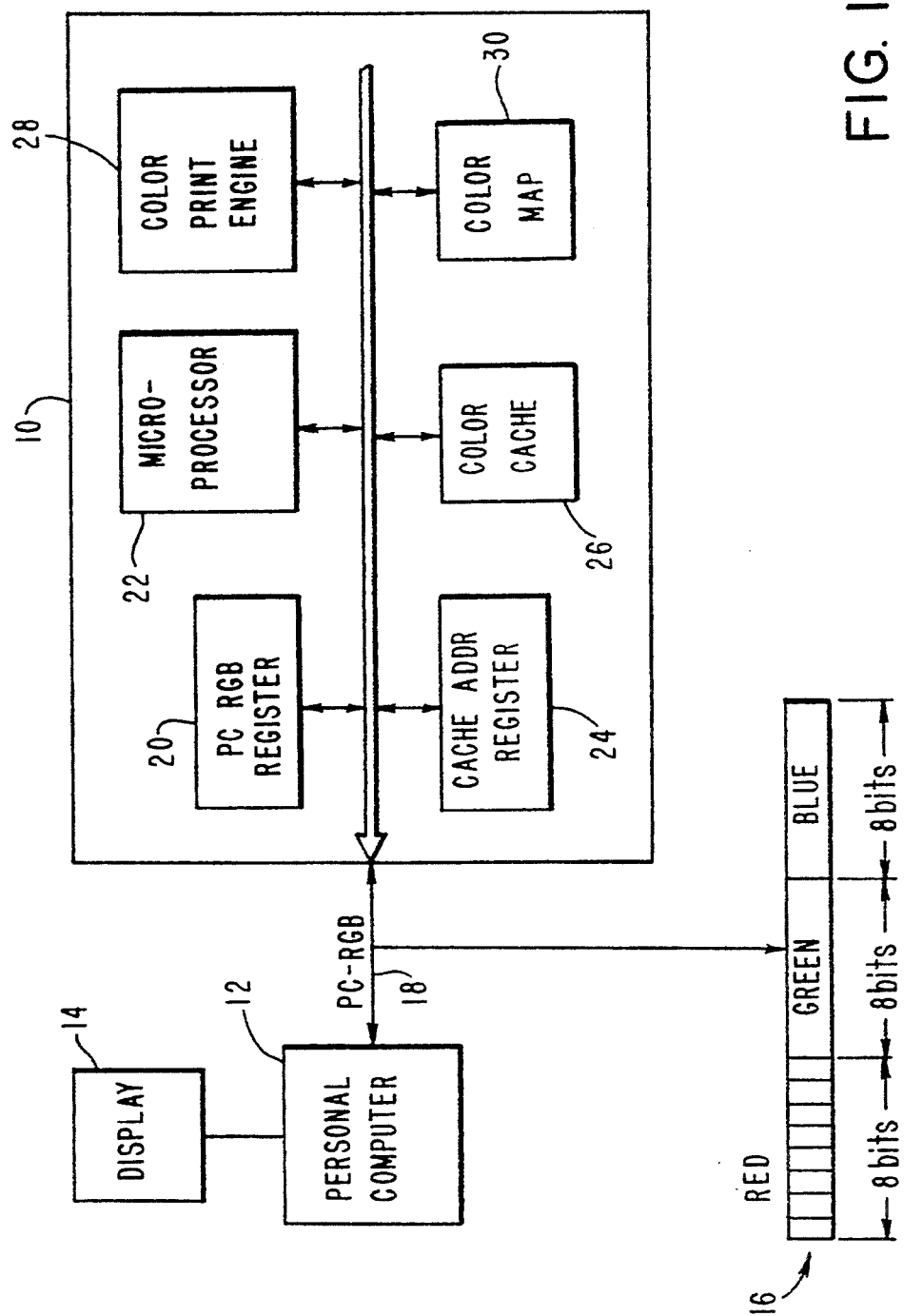
FIG. 1 is a high level block diagram of a personal computer and a connected ink jet color printer.
Figure 2:
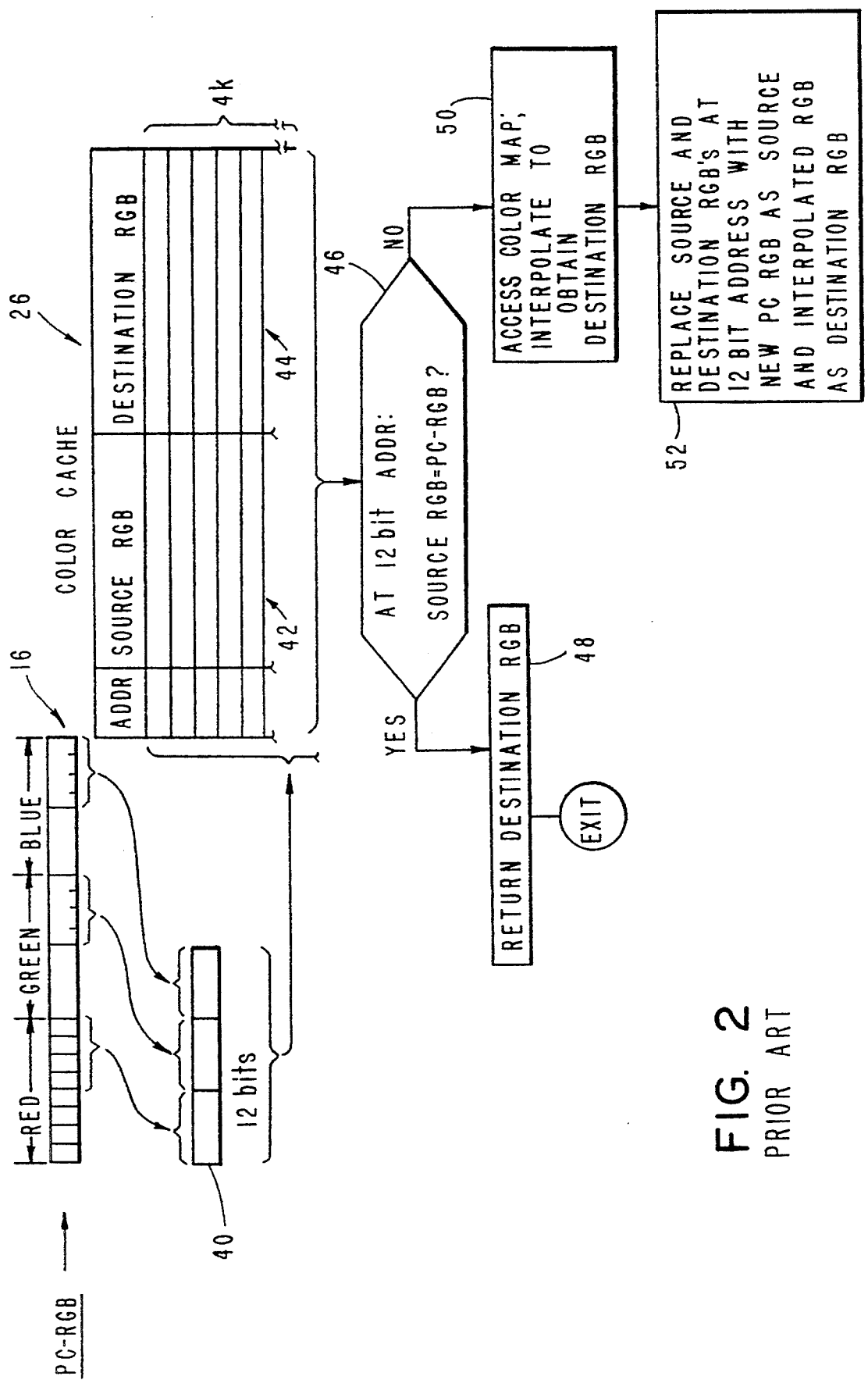
FIG. 2 is a high level schematic showing the procedure followed by the color printer of FIG. 1 in responding to a personal computer generated color value.
Figure 3:
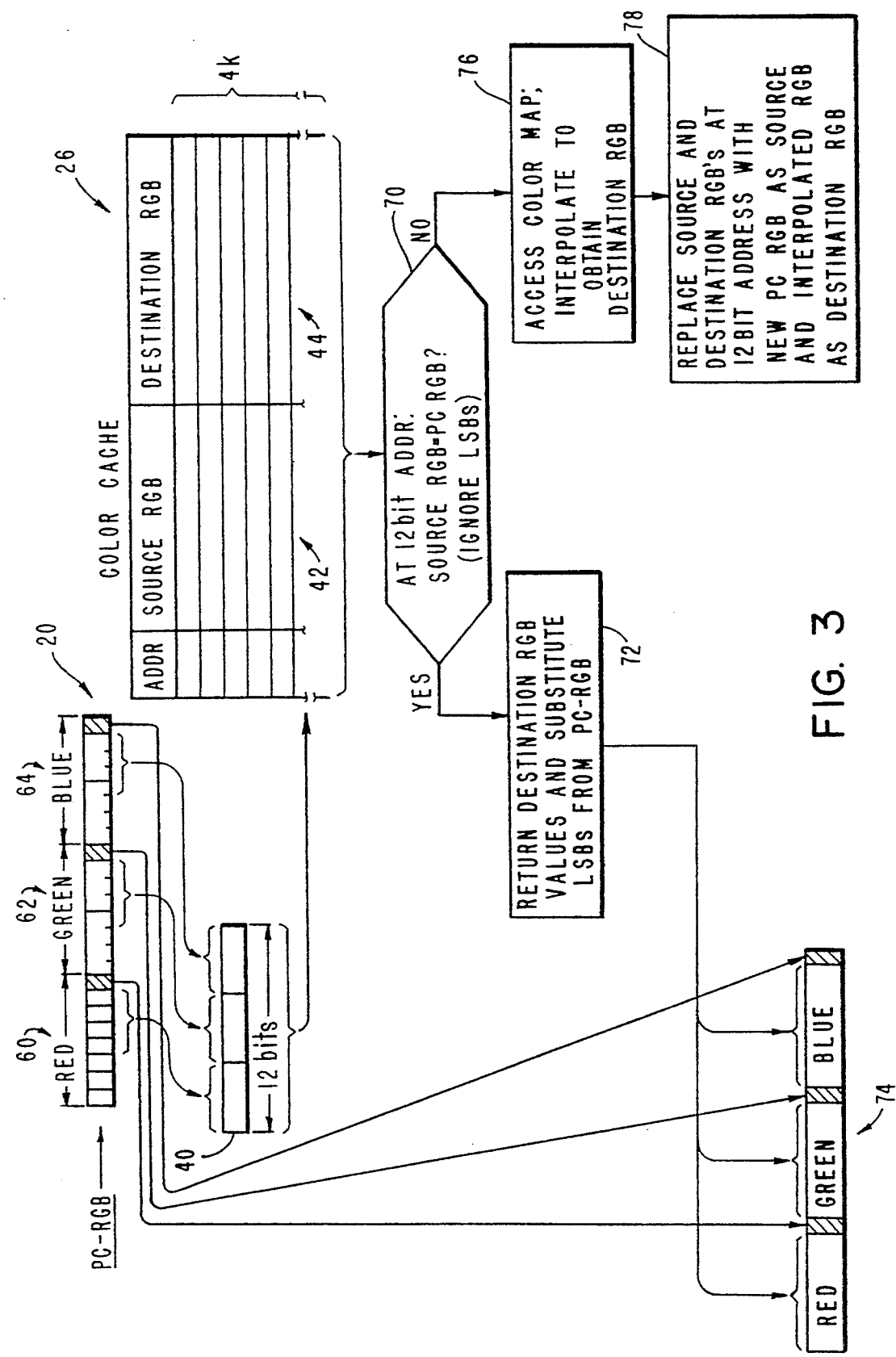
FIG. 3 is a high level schematic showing the procedure followed by a printer incorporating the invention hereof in response to a received personal computer generated color value.

The above will be better understood by referring to FIG. 3 wherein PC-RGB register 20 (as shown in FIG. 1) is illustrated as containing a received PC-RGB value comprising red, green and blue bytes 60, 62 and 64, respectively. In lieu of employing the lowermost 4 bits of each of bytes 60, 62 and 64 to comprise address 40, the second through fifth least significant bits of each of bytes 60, 62 and 64 are employed to comprise the address. For the time being, each of the least significant bits in bytes 60, 62 and 64 are ignored. Address 40 is then used in the same manner as above described in FIGS. 1 and 2 to address color cache 26.

At the address indicated by address 40, Source RGB value 42 is accessed and the 7 most significant bits of each of the 3 color bytes stored thereat are compared with the 7 most significant bits of PC RGB values 60, 62, and 64 (decision box 70). If a match is determined, then Destination color value 44 (e.g., 3 bytes) is returned (box 72) and inserted into a Destination register 74. However, in lieu of employing the least significant bits of each of the 3 bytes that comprise Destination color value 44, the least significant bits from bytes 60, 62 and 64 are substituted therefor into destination register 74, it being assumed that the LSBs from bytes 60, 62 and 64 are more accurate representations of the color to be reproduced than the LSBs from the bytes that comprise Destination color value 44.

If there is no cache hit as a result of the action indicated in decision box 70, the procedure again accesses color map 30 (box 76) and interpolates to obtain a new Destination color value. At that point, color cache 26 is then updated (box 78) in accordance with the procedure described with respect to FIG. 2. It should be understood that other updating procedures may be employed for color cache 26 (e.g., most "often" or "recently" used Source/Destination color values).

It can thus be seen that by avoiding use of the LSBs of each byte of a received PC-RGB color value, an address can be obtained that enables color cache 26 to simulate an 8 time larger cache size than is actually employed. The cost of this action is a slight loss in color accuracy; however, for an ink jet printer, such loss in accuracy is generally not perceivable by the user. As a result, a higher percentage of cache hits occur thereby enabling an improvement in print speed.

It should be understood that the foregoing description is only illustrative of the invention. Various alternatives and modifications can be devised by those skilled in the art without departing from the invention. While the invention has been described with a single LSB being ignored, it will be understood by those skilled in the art that more than one LSB of each color byte could be ignored and additional higher order bits employed to provide a large cache simulation. In addition, while the invention has been described with respect to a color ink jet printer, it is equally applicable to other color output apparatus which is required to perform a color transformation. Accordingly, the present invention is intended to embrace all such alternatives, modifications and variances which fall within the scope of the appended claims.

We claim:

1. Color output apparatus for receiving from a connected computer, plural N-bit color values, P N-bit color values indicating a computer generated color to be printed, where P and N are integers and there are $2^{NP}$ possible combinations of bits in said P N-bit color values, each N-bit color value having a least significant bit, said color output apparatus comprising:

means for creating an address from multiple-bit segments of each of P N-bit color values of a received computer generated color value, each multiple-bit segment excluding at least said least significant bit of each said N-bit color value;

cache memory means having substantially less addresses than $2^{NP}$, each cache address including a Source entry and a Destination entry, said Source entry comprising P values indicative of a computer generated color and said Destination entry usable by said color output apparatus to reproduce a color indicated by said Source entry; and processor means for determining a match between said Source entry and a received computer generated color value at an address created from said received computer generated color value, said match disregarding at least a least significant bit of each said N-bit value comprising said Source entry at said address, the processor means further responsive to a determined match at said address, to access said Destination entry at said address and to employ said Destination entry at said address to control said color output apparatus, whereby exclusion of least significant bits in said determining a match enables a greater probability of finding a match.

2. The color output apparatus as recited in claim 1 wherein each said Destination entry comprises P N-bit color values and said processor means substitutes excluded least significant bits from said P N-bit color values of a received computer generated color value that matches a Source entry, for least significant bits of the P N-bit color values of said Destination entry at said address.

3. The color output apparatus as recited in claim 2 wherein each said address produced by said means for creating ignores only the least significant bit of each said N-bit color value.

4. The color output apparatus as recited in claim 2 further comprising:

a color map for storing computer generated color values and associated Destination values and wherein said processor means is responsive to a determined non-match, to employ said P N-bit color values of a received computer generated color value to address said color map and if no matching P N-bit color value is found in said color map, to interpolate from a closest P N-bit color value in said color map to obtain an interpolated Destination value.

5. The color output apparatus as recited in claim 2, wherein said apparatus is a color ink jet printer.

6. The color output apparatus as recited in claim 5 wherein said created address is a concatenation of four bits from each said N-bit value and P=3, N=8, and said cache memory means has $2^{12}$ addresses.

7. A method for improving color matching in an ink jet color printer, said ink jet color printer including a controlling processor, a cache memory and an ink jet printer engine, said cache memory including Source entry and a Destination entry, said Source entry being a PC-RGB value and said Destination entry being a color value usable by said ink jet printer engine to reproduce the color of said Source entry, said method comprising the steps of:

receiving a PC-RGB color value from a connected computer, said PC-RGB color value comprising P N-bit color values, where P and N are integers, each N-bit color value having a least significant bit;

creating a cache address from said received PC-RGB color value by combining multiple bit segments of each N-bit color value of said received PC-RGB color value, each multiple bit segment excluding at least said least significant bit of said N-bit color value;

determining if a match occurs between said received PC-RGB color value and a Source entry in said cache memory at said cache address created from said received PC-RGB color value, said match disregarding at least a least significant bit of each N-bit color value comprising said Source entry at said cache address; and responding to a match at said cache address by accessing said Destination entry at said cache address and employing said Destination entry to control said ink jet printer engine.

8. The method as recited in claim 7 further comprising the step of:

substituting excluded least significant bits from said received PC-RGB color value employed to create said cache address, for least significant bits of color values of said Destination entry at said cache address.

9. The method as recited in claim 8 wherein said cache address excludes only said least significant bit from each N-bit color value.

\* \* \* \* \*